United States Patent Office 3,184,447
Patented May 18, 1965

3,184,447
BIS-CHLOROMETHYLSULFONAMIDES OF CYCLIC DIAMINES
Leo A. Paquette, Portage Township, Kalamazoo County, Mich., assignor to The Upjohn Company, Kalamazoo, Mich., a corporation of Delaware
No Drawing. Filed Dec. 4, 1962, Ser. No. 242,070
4 Claims. (Cl. 260—239)

This invention relates to novel compositions of matter and to a process for their preparation and is particularly directed to chloromethylsulfonamides of cyclic diamines and to their preparation.

The novel compounds of the invention have the following formula:

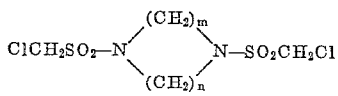

wherein $m$ and $n$ are 2 or 3. They have analgetic activity and are useful for producing analgesia in mammals, poultry, and other animals when administered orally or parenterally. They also have antifungal activity and can be used as an industrial or agricultural fungicide.

The novel compounds of the invention are prepared by reacting chloromethanesulfonyl chloride with a cyclic diamine having the formula:

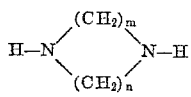

wherein $m$ and $n$ are 2 or 3. The reaction advantageously is carried out in the presence of an inert solvent and an acid binding agent for reaction with the hydrogen chloride liberated during the reaction. An excess of the cyclic diamine can be used as the acid binding agent; alternatively there can be used for this purpose an inorganic base such as sodium hydroxide or a tertiary amine such as triethylamine, pyridine, and N-methylpiperidine. Advantageously the inert solvent is an aprotic solvent, for example, a chlorinated hydrocarbon solvent, such as chloroform, methylene chloride, dichloroethane, and chlorobenzene. Hydroxylic solvents, e.g., water, methanol and like alkanols and acetic acid and like acids, can be used but are less desirable because of the difficulty of isolating the product from the reaction mixture. The temperature can vary from about 0° C. (with longer reaction times) to the boiling point of the solvent, but is preferably maintained between about 20° and about 100° C. Cooling of the reaction mixture initially may be desirable to avoid excessive heating.

The invention may be more fully understood by reference to the following illustrative examples.

GENERAL PROCEDURE

Equimolar quantities of chloromethanesulfonyl chloride and cyclic diamine were used. To a stirred chloroform solution of the diamine (0.10 mole per 100 ml. of chloroform) was added dropwise a chloroform solution of chloromethanesulfonyl chloride (0.10 mole of chloromethanesulfonyl chloride per 50 ml. of chloroform) with intermittent cooling to keep the temperature at 30–40° C. When the addition was completed, the mixture was refluxed with stirring for 1–2 hrs. The reaction mixture was then cooled and the precipitated crystalline product was obtained by filtration, dried, and recrystallized from a suitable solvent.

Example 1
1,4-BIS(CHLOROMETHYLSULFONYL)PIPERAZINE

From 8.6 g. (0.10 mole) of piperazine and 14.9 g. (0.10 mole) of chloromethanesulfonyl chloride, there was precipitated 7.6 g. (48.7 percent) of white solid, M.P. 194–199° C. Three recrystallizations of this material from glacial acetic acid gave pure 1,4-bis(chloromethylsulfonyl)piperazine as white needles, M.P. 231.5–233° C.

*Analysis.*—Calcd. for $C_6H_{12}Cl_2N_2O_4S_2$: C, 23.15; H, 3.89; Cl, 22.79; N, 9.00. Found: C, 22.96; H, 3.90; Cl, 22.56; N, 8.77.

Example 2
1,4-BIS(CHLOROMETHYLSULFONYL)HEXAHYDRO-1,4-DIAZEPINE

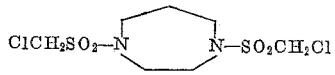

From 10.0 g. (0.10 mole) of homopiperazine and 14.9 g. (0.10 mole) of chloromethanesulfonyl chloride, there was precipitated 12.8 g. (78.5 percent) of white solid, M.P. 181–196° C. Three recrystallizations of this material from glacial acetic acid gave pure 1,4-bis(chloromethylsulfonyl)hexahydro-1,4-diazepine as small, white needles, M.P. 201–202.5° C.

*Analysis.*—Calcd. for $C_7H_{14}Cl_2N_2O_4S_2$: C, 25.85; H, 4.34; Cl, 21.80. Found: C, 25.84; H, 4.36; Cl, 21.95.

Example 3
1,5-BIS(CHLOROMETHYLSULFONYL)OCTAHYDRO-1,5-DIAZOCINE

From 17.0 g. (0.149 mole) of 1,5-diazacyclooctane and 22.2 g. (0.149 mole) of chloromethanesulfonyl chloride, there was precipitated 16.3 g. (64.4 percent) of white solid, M.P. 234–239° C. Two recrystallizations of this material from glacial acetic acid gave pure 1,5-bis(chloromethylsulfonyl)octahydro-1,5-diazocine as long, white needles, M.P. 242–244° C.

*Analysis.*—Calcd. for $C_8H_{16}Cl_2N_2O_4S_2$: C, 28.32; H, 4.75; Cl, 20.90. Found: C, 28.48; H, 5.07; Cl, 20.94.

I claim:
1. A compound of the formula:

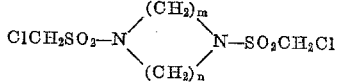

wherein $m$ and $n$ are integers of from 2 to 3.
2. 1,4-bis(chloromethylsulfonyl)piperazine.
3. 1,4-bis(chloromethylsulfonyl)hexahydro-1,4-diazepine.
4. 1,5-bis(chloromethylsulfonyl)octahydro-1,5-diazocine.

References Cited by the Examiner

UNITED STATES PATENTS 2,759,941  8/56  Phillips et al. _____ 260—294
3,098,066  7/63  Mull _____ 260—239

OTHER REFERENCES

Burger: Medicinal Chemistry (New York, 1960), pages 81, 43, and 1055.

Groszkowski et al.: Chem. Abstracts, vol. 53, page 8151 (1959).

Heine et al.: J. Am. Chem. Soc., vol. 83, pages 2570–4 (1961).

Hickinbottom: Reactions of Organic Compounds (London, 1948), pages 294–298 and 426.

IRVING MARCUS, *Primary Examiner.*
JOHN D. RANDOLPH, NICHOLAS S. RIZZO,
*Examiners.*